(12) United States Patent
Takatori

(10) Patent No.: US 9,028,109 B2
(45) Date of Patent: May 12, 2015

(54) LIGHT FLUX CONTROLLING MEMBER, LIGHT EMITTING DEVICE, SURFACE LIGHT SOURCE DEVICE, AND DISPLAY APPARATUS

(71) Applicant: Enplas Corporation, Saitama (JP)

(72) Inventor: Hiroshi Takatori, Saitama (JP)

(73) Assignee: ENPLAS Corporation, Saitama (JP)

( * ) Notice: Subject to any disclaimer, the term of this patent is extended or adjusted under 35 U.S.C. 154(b) by 40 days.

(21) Appl. No.: 14/063,985

(22) Filed: Oct. 25, 2013

(65) Prior Publication Data

US 2014/0119027 A1 May 1, 2014

(30) Foreign Application Priority Data

Oct. 25, 2012 (JP) ................................. 2012-235618

(51) Int. Cl.
| | |
|---|---|
| F21V 7/00 | (2006.01) |
| F21V 13/04 | (2006.01) |
| F21V 5/04 | (2006.01) |
| G02B 19/00 | (2006.01) |

(52) U.S. Cl.
CPC . *F21V 13/04* (2013.01); *F21V 5/04* (2013.01); *G02B 19/0014* (2013.01); *G02B 19/0061* (2013.01)

(58) Field of Classification Search
USPC ..................................... 362/308, 309, 311.02
See application file for complete search history.

(56) References Cited

U.S. PATENT DOCUMENTS

| | | | |
|---|---|---|---|
| 2006/0083000 A1 | 4/2006 | Yoon et al. | |
| 2014/0119018 A1* | 5/2014 | Tseng | 362/268 |
| 2014/0126217 A1* | 5/2014 | Hand | 362/308 |
| 2014/0301085 A1* | 10/2014 | Hwang et al. | 362/308 |
| 2015/0003078 A1* | 1/2015 | Hu et al. | 362/311.02 |

FOREIGN PATENT DOCUMENTS

JP 2006-114863 A 4/2006

* cited by examiner

*Primary Examiner* — Evan Dzierzynski
(74) *Attorney, Agent, or Firm* — Brundidge & Stanger, P.C.

(57) ABSTRACT

A light flux controlling member includes an emission surface, a first incidence surface that is an inner surface of a concave portion, a second incidence surface that is disposed outside an opening rim portion of the concave portion, and a rear surface. A plurality of annular grooves is formed in the second incidence surface. Each annular groove forms an intersection line with an adjacent annular groove. When a virtual plane that passes through the outer rim portion of the second incidence surface and is orthogonal to the central axis is assumed as a reference plane, the plurality of annular grooves is disposed so that the intersection line become close to the virtual plane with distance from the central axis. The shape of a cross section of the annular groove including the central axis is an arc of which the center of curvature is located outside the light flux controlling member.

10 Claims, 12 Drawing Sheets

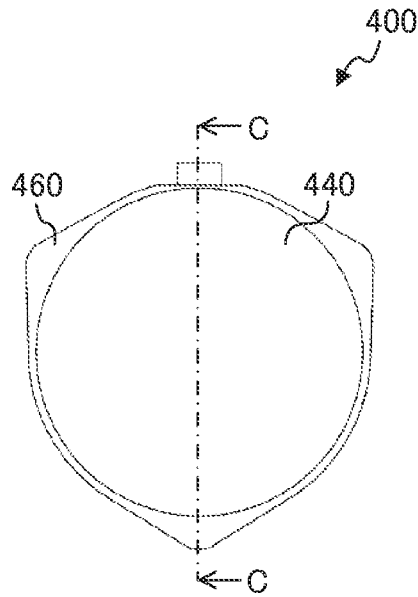
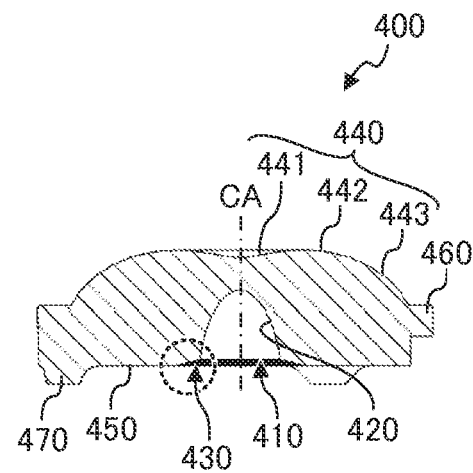
FIG. 5A
FIG. 5B
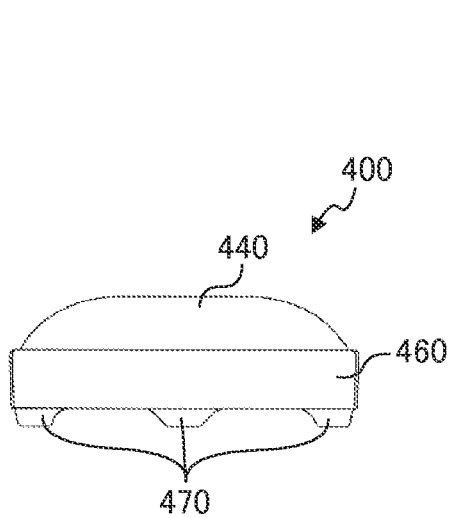
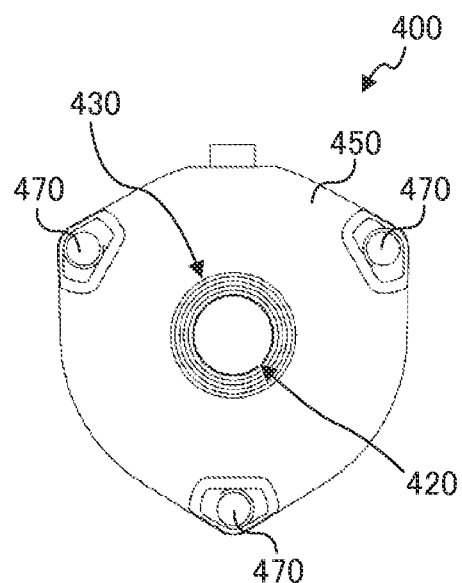
FIG. 5C
FIG. 5D

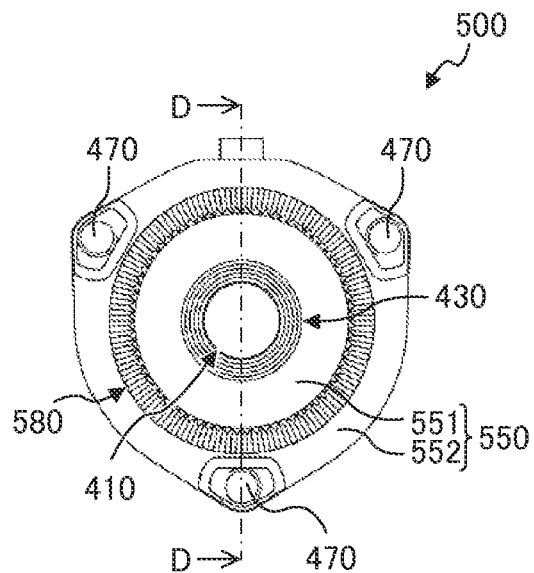
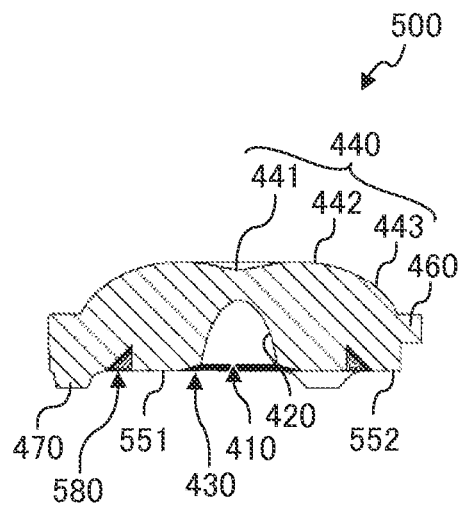
FIG. 11A          FIG. 11B
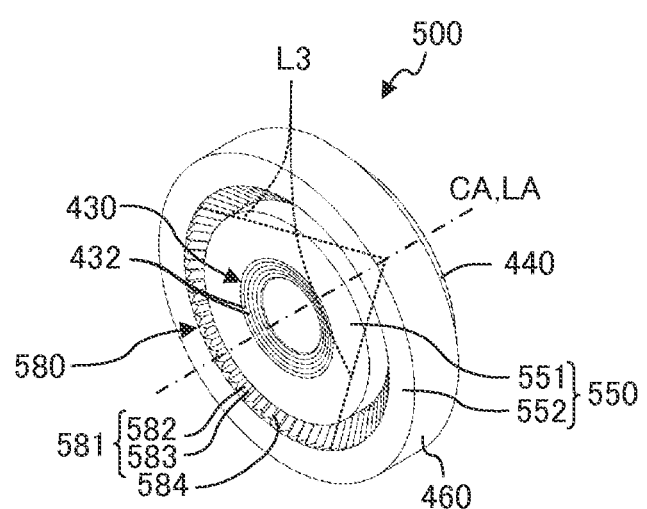
FIG. 11C

LIGHT FLUX CONTROLLING MEMBER, LIGHT EMITTING DEVICE, SURFACE LIGHT SOURCE DEVICE, AND DISPLAY APPARATUS

CROSS REFERENCE TO RELATED APPLICATIONS

This application is entitled and claims the benefit of Japanese Patent Application No. 2012-235618 filed on Oct. 25, 2012, the disclosure of which including the specification, drawings and abstract is incorporated herein by reference in its entirety.

TECHNICAL FIELD

The present invention relates to a light flux controlling member that controls distribution of light emitted from a light emitting element. Further, the present invention relates to a light emitting device, a surface light source device and a display apparatus that include the light flux controlling member.

BACKGROUND ART

In a transmissive image display apparatus such as a liquid crystal display apparatus, a direct surface light source device may be used as a backlight. In recent years, a direct surface light source device that includes plural light emitting elements as a light source has been used.

For example, a direct surface light source device includes a substrate, plural light emitting elements, plural light flux controlling members and a light diffusion member. The plural light emitting elements are arranged on the substrate in a matrix shape. The light flux controlling member that spreads light emitted from each light emitting element in a surface direction of the substrate is disposed above each light emitting element. The light emitted from the light flux controlling member is diffused by the light diffusion member and planarly illuminates an illuminated member (liquid crystal panel, for example) (see Japanese Patent Application Laid-Open No. 2006-114863, for example).

FIGS. 1A and 1B are diagrams illustrating a surface light source device related to Japanese Patent Application Laid-Open No. 2006-114863. FIG. 1A is a cross-sectional view and a view of an optical path of the surface light source device in a case where there is no gap between a substrate and a light flux controlling member. FIG. 1B is a cross-sectional view and a view of an optical path of the surface light source device in a case where there is a gap between the substrate and the light flux controlling member. As shown in FIG. 1A, surface light source device 10 related to Japanese Patent Application Laid-Open No. 2006-114863 includes substrate 20, light emitting element 30 (light emitting chip) that is disposed on substrate 20, light flux controlling member 40 (lens) that is disposed on substrate 20 without a gap to cover light emitting element 30 and controls distribution of light emitted from light emitting element 30, and light diffusion member 50 that transmits the light emitted from light flux controlling member 40 while diffusing the light. Light flux controlling member 40 includes incidence surface 42 on which the light emitted from light emitting element 30 is incident, emission surface 44 through which the light incident on incidence surface 42 is emitted to the outside, and rear surface 46 that is formed on a side opposite to emission surface 44.

As shown in FIG. 1A, the light emitted from light emitting element 30 enters light flux controlling member 40 through incidence surface 42. The light that enters light flux controlling member 40 reaches emission surface 44 and is then emitted to the outside through emission surface 44. Here, the light is refracted by the shape of emission surface 44 and approximately uniformly irradiates light diffusion member 50.

CITATION LIST

Patent Literature

PTL 1
Japanese Patent Application Laid-Open No. 2006-114863

SUMMARY OF INVENTION

Technical Problem

As shown in FIG. 1B, in surface light source device 10 as mentioned above, light flux controlling member 40 may be disposed so that rear surface 46 of light flux controlling member 40 is disposed above a light emission surface of light emitting element 30 in consideration of radiation of heat generated by light emitting element 30, mounting of light flux controlling member 40 to substrate 20, and the like. In this case, the light from light emitting element 30 enters light flux controlling member 40 not only through incidence surface 42 but also through rear surface 46 in the vicinity of incidence surface 42. The light that enters light flux controlling member 40 through rear surface 46 in the vicinity of incidence surface 42 is deflected in a directly upward direction. For this reason, a belt-shaped bright part (bright belt) is generated in light diffusion member 50 due to the light that enters light flux controlling member 40 through rear surface 46 (see a portion surrounded by a broken line in FIG. 1B). In this manner, in surface light source device 10 in which the gap is provided between substrate 20 and light flux controlling member 40, luminance unevenness may occur.

An advantage of some aspects of the invention is to provide a light flux controlling member that controls distribution of light emitted from a light emitting element and is capable of suppressing the occurrence of luminance unevenness even in a case where a gap is provided between a substrate and the light flux controlling member.

Another advantage of some aspects of the invention is to provide a light emitting device, a surface light source device and a display apparatus that include the light flux controlling member.

Solution to Problem

According to an aspect of the invention, there is provided a light flux controlling member that controls distribution of light emitted from a light emitting element, including: an emission surface formed on a front side of the light flux controlling member to intersect with a central axis of the light flux controlling member; a first incidence surface formed on a rear side of the light flux controlling member, the first incidence surface being an inner surface of a concave portion that is rotationally symmetric with respect to the central axis; a second incidence surface disposed outside an opening rim portion of the concave portion to surround the central axis; and a rear surface that extends radially outwardly from an outer rim portion of the second incidence surface, wherein a plurality of annular grooves is formed on the second incidence surface, wherein each of the plurality of annular grooves forms an annular intersection line in cooperation with another adjacent annular groove, wherein when a plane that passes through the outer rim portion of the second incidence surface and is orthogonal to the central axis is assumed as a reference plane, the plurality of annular grooves is disposed so that the intersection line become close to the reference plane with distance from the central axis, wherein the shape of a cross section of the annular groove including the central axis is an arc of which the center of curvature is located outside the light flux controlling member.

According to another aspect of the invention, there is provided a light emitting device including: a light emitting element; and the light flux controlling member according to the above aspect of the invention, wherein the light flux controlling member is disposed so that the central axis coincides with an optical axis of the light emitting element.

According to still another aspect of the invention, there is provided a surface light source device including: the light emitting device according to the above aspect of the invention; and a light diffusion member that transmits light from the light emitting device while diffusing the light.

According to still another aspect of the invention, there is provided a display apparatus including: the surface light source device according to the above aspect of the invention; and a display member that is irradiated with light emitted from the surface light source device.

Advantageous Effects of Invention

In the light emitting device including the light flux controlling member according to the invention, it is possible to uniformly radiate light even in a case where a gap is provided between a substrate and the light flux controlling member, compared with a light emitting device including a light flux controlling member in the related art. Accordingly, in the surface light source device and the display apparatus according to the invention, luminance unevenness is minor compared with the related art.

BRIEF DESCRIPTION OF DRAWINGS

FIGS. 5A to 5D are diagrams illustrating a configuration of a light flux controlling member according to Embodiment 1;

FIGS. 11A to 11C are diagrams illustrating a configuration of a light flux controlling member according to Embodiment 2.

DESCRIPTION OF EMBODIMENTS

Hereinafter, embodiments of the invention will be described in detail referring to the accompanying drawings. In the following description, a surface light source device that is suitable for a backlight of a liquid crystal display apparatus will be described as a representative example of a surface light source device according to the invention. The surface light source device is combined with an illuminated member (liquid crystal panel, for example) to be irradiated with light from the surface light source device, which may be used as a display apparatus.

Embodiment 1

Configuration of Surface Light Source Device and Light Emitting Device

Figure 1A:
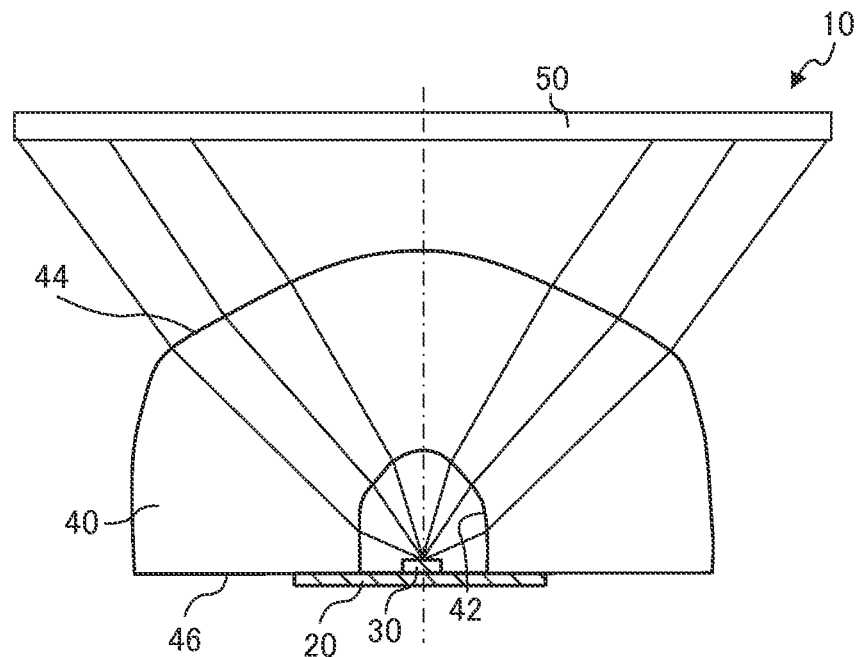
FIGS. 1A and 1B are cross-sectional views and views of an optical path of a surface light source device disclosed in Japanese Patent Application Laid-Open No. 2006-114863.
Figure 1B:
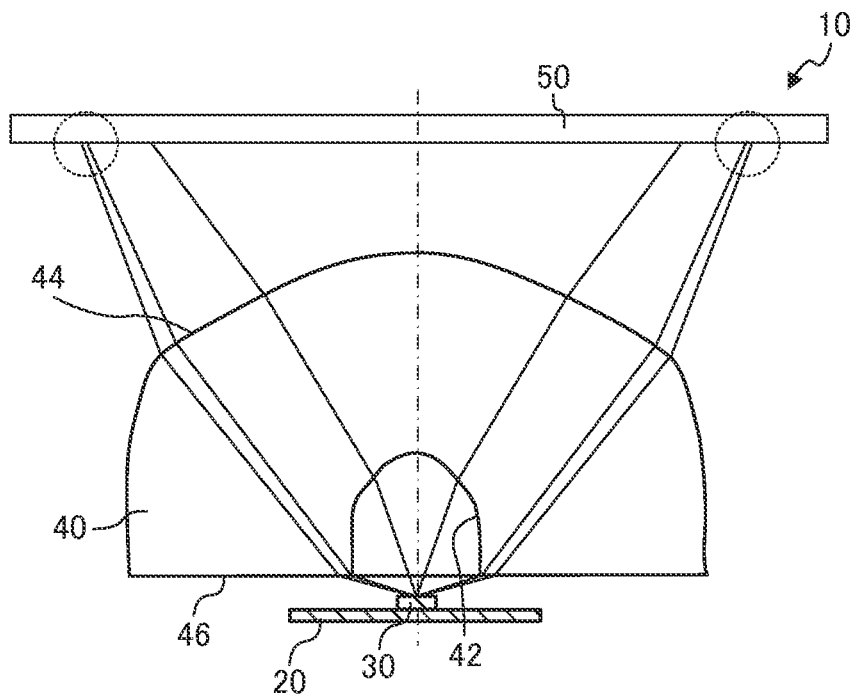
Figure 2A:
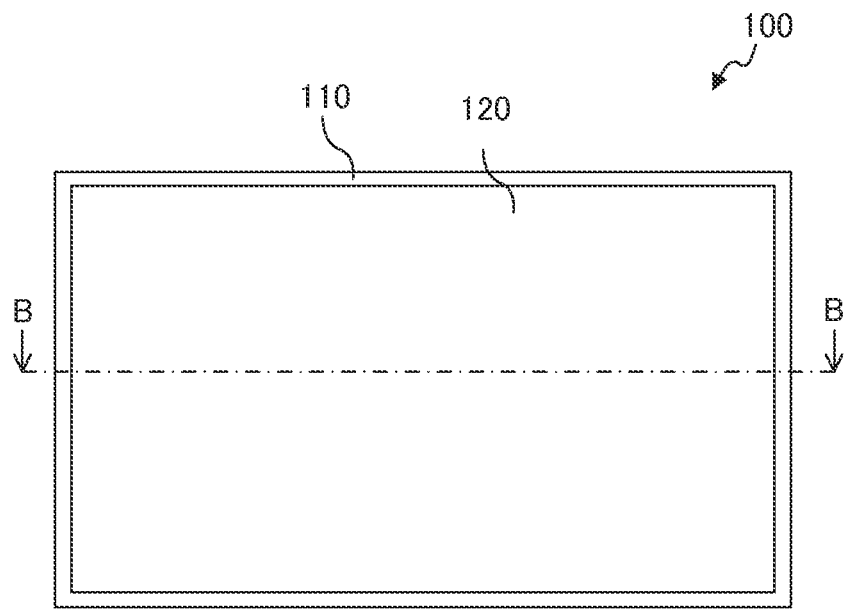
FIGS. 2A and 2B are outer appearance views illustrating a configuration of a surface light source device according to Embodiment 1.
Figure 2B:
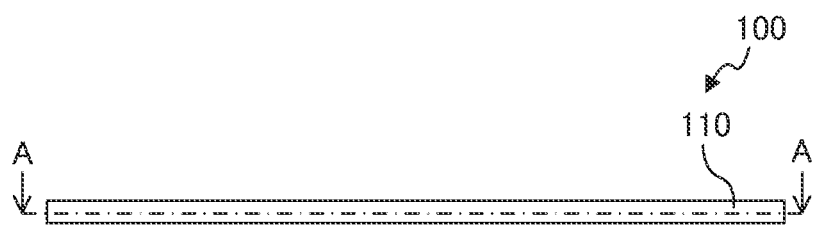
Figure 3A:
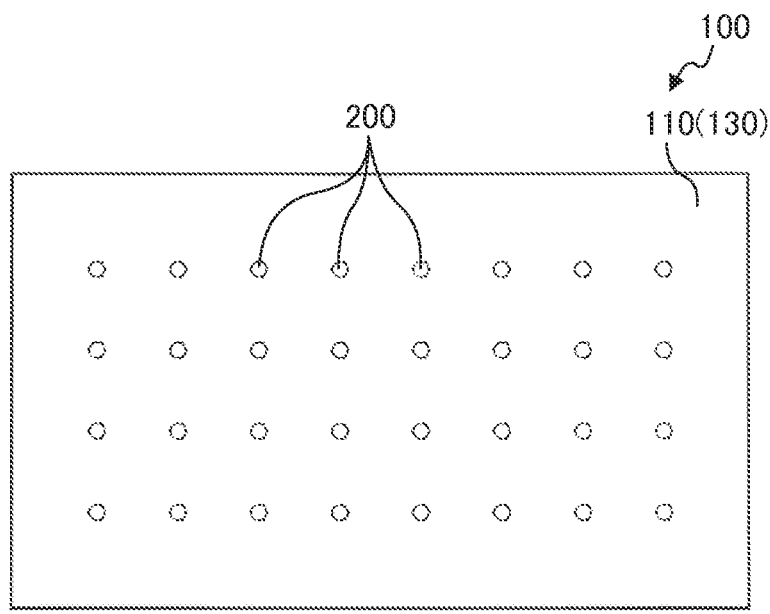
FIGS. 3A and 3B are cross-sectional views illustrating the configuration of the surface light source device according to Embodiment 1.
Figure 3B:
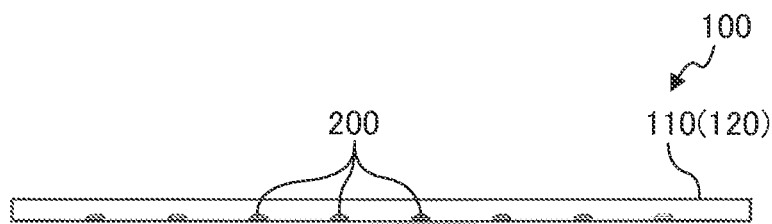
Figure 4:
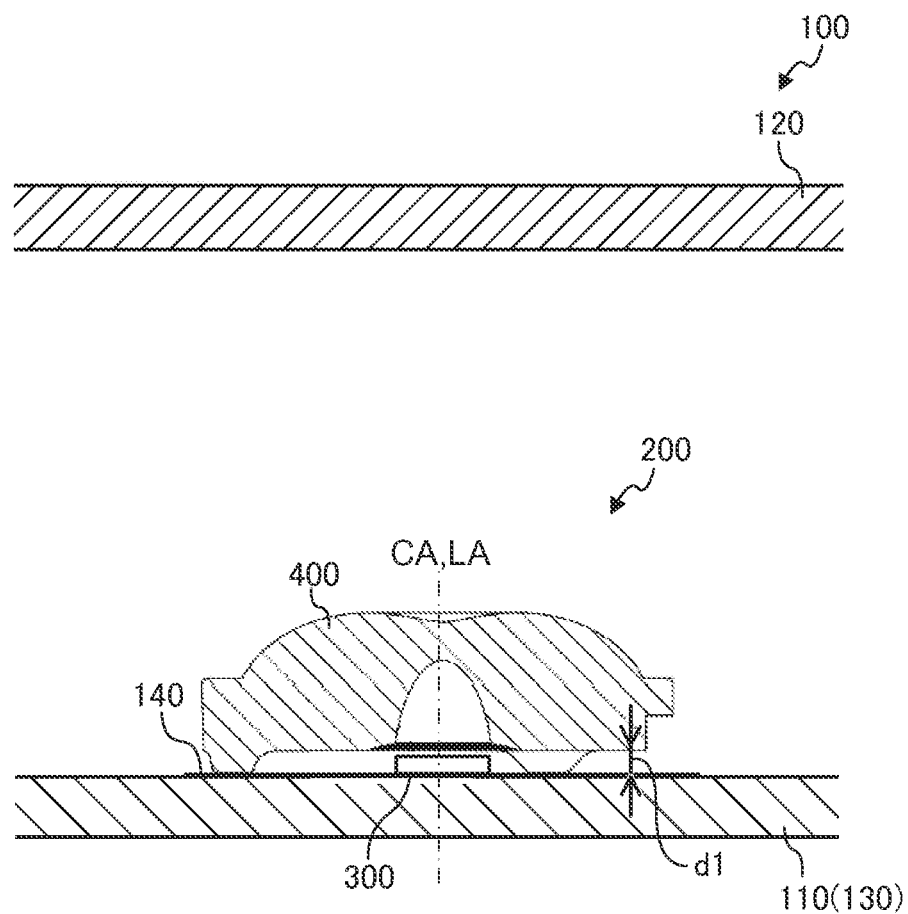
FIG. 4 is an enlarged cross-sectional view illustrating parts of the surface light source device in FIG. 3B.

FIGS. 2A and 2B to FIGS. 6A and 6B are diagrams illustrating a configuration of the surface light source device according to Embodiment 1. FIG. 2A is a plan view of the surface light source device according to Embodiment 1, and FIG. 2B is a front view thereof. FIG. 3A is a cross-sectional view taken along line A-A in FIG. 2B, and FIG. 3B is a cross-sectional view taken along line B-B in FIG. 2A. FIG. 4 is an enlarged cross-sectional view of a part of the surface light source device in FIG. 3B.

As shown in FIGS. 2A and 2B and FIGS. 3A and 3B, surface light source device 100 according to Embodiment 1 includes casing 110, light diffusion member 120, and plural light emitting devices 200. Plural light emitting devices 200 are disposed on bottom plate 130 of casing 110 in a matrix shape. An inner surface of bottom plate 130 functions as a diffusion and reflection surface. Further, an opening is provided on a top plate of casing 110. Light diffusion member 120 is disposed to close the opening, and functions as a light emitting surface. The size of the light emitting surface is not particularly limited, but for example, is about 400 mm×about 700 mm (32 inches).

As shown in FIG. 4, each of plural light emitting devices 200 is fixed onto substrates 140. Plural substrates 140 are fixed at predetermined positions on bottom plate 130 of casing 110. Each of plural light emitting devices 200 includes light emitting element 300 and light flux controlling member 400.

Light emitting element 300 is a light source of surface light source device 100 and is mounted on substrate 140. Light emitting element 300 is a light emitting diode (LED) such as a white light emitting diode, for example.

Light flux controlling member 400 is a diffusion lens that controls distribution of light emitted from light emitting element 300, and is fixed onto substrate 140. Light flux controlling member 400 is disposed on light emitting element 300 so that central axis CA of the light flux controlling member coincides with optical axis LA of light emitting element 300. Both of first incidence surface 420 and emission surface 440 of light flux controlling member 400 to be described later are rotationally symmetric (circularly symmetric), and their axes of rotation coincide with each other. The axes of rotation of first incidence surface 420 and emission surface 440 are referred to as "central axis CA of a light flux controlling member". Further, "optical axis LA of a light emitting element" means a central beam of three-dimensional light fluxes emitted from light emitting element 300. Between substrate 140 on which light emitting element 300 is mounted and rear surface 450 of light flux controlling member 400, gap dl for releasing heat generated from light emitting element 300 to the outside is formed.

Light flux controlling member 400 is formed by integral molding. The material of light flux controlling member 400 is not particularly limited as long as it is a material capable of transmitting light of a desired wavelength. For example, the material of light flux controlling member 400 is a light transmitting resin such as polymethylmethacrylate (PMMA), polycarbonate (PC) or epoxy resin (EP), or glass.

Surface light source device 100 according to the present embodiment has a main feature in the configuration of light flux controlling member 400. Details of light flux controlling member 400 will be described later.

Light diffusion member 120 is a plate-shaped member having a light diffusion characteristic, and transmits light emitted from light emitting device 200 while diffusing the light. In general, light diffusion member 120 has approximately the same size as that of the illuminated member such as a liquid crystal panel. For example, light diffusion member 120 is formed of a light transmitting resin such as polymethylmethacrylate (PMMA), polycarbonate (PC), polystyrene (PS) or methylmethacrylate-styrene copolymer resin (MS). In order to provide the light diffusion characteristic, fine concaves and convexes are formed on a surface of light diffusion member 120, or light diffusion objects such as beads are dispersed inside light diffusion member 120.

In surface light source device 100 according to the present embodiment, light emitted from each light emitting element 300 is spread to irradiate a wide range of light diffusion member 120 by each light flux controlling member 400. Light emitted from each light flux controlling member 400 is further diffused by light diffusion member 120. As a result, surface light source device 100 according to the present embodiment is capable of uniformly irradiating a flat illuminated member (liquid crystal panel, for example).

Configuration of Light Flux Controlling Member

Figure 6A:
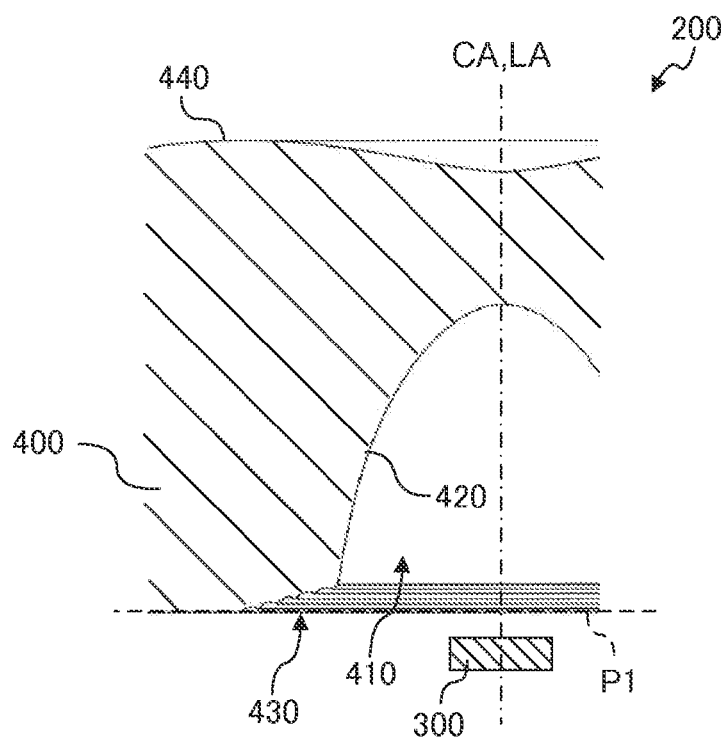
FIGS. 6A and 6B are partially enlarged cross-sectional views of the light flux controlling member in FIG. 5B.
Figure 6B:
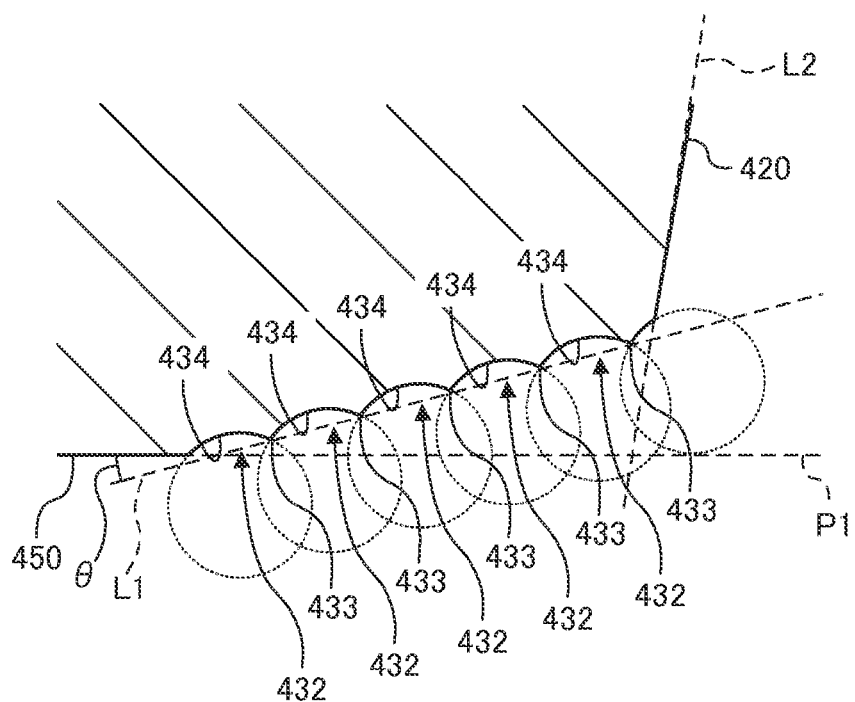

FIGS. 5A to 5D are diagrams illustrating light flux controlling member 400 according to Embodiment 1. FIG. 5A is a plan view of light flux controlling member 400 according to Embodiment 1, FIG. 5B is a cross-sectional view taken along line C-C in FIG. 5A, FIG. 5C is a front view thereof, and FIG. 5D is a bottom view thereof. FIGS. 6A and 6B are partially enlarged cross-sectional views of light flux controlling member 400 in FIG. 5B. FIG. 6A is a partially enlarged cross-sectional view in the vicinity of second incidence surface 430, and FIG. 6B is a diagram illustrating a structure of second incidence surface 430. In FIG. 6A, light emitting element 300 is shown for description of second incidence surface 430.

As shown in FIGS. 5A to 5D and FIGS. 6A and 6B, light flux controlling member 400 includes concave portion 410, first incidence surface 420, second incidence surface 430, emission surface 440, rear surface 450, flange 460, and plural legs 470.

Concave portion 410 is formed at a central part on a rear side of light flux controlling member 400 (on the side of light emitting element 300). An inner surface of concave portion 410 functions as first incidence surface 420. First incidence surface 420 causes most of light emitted from light emitting element 300 to enter the inside of light flux controlling member 400 while controlling the light travelling direction. First incidence surface 420 intersects with central axis CA of light flux controlling member 400, and is rotationally symmetric (circularly symmetric) with central axis CA as an axis.

Second incidence surface 430 causes most of light, among the light emitted from light emitting element 300, that is not incident on first incidence surface 420 to enter the inside of light flux controlling member 400 while controlling its travelling direction. Second incidence surface 430 is disposed outside an opening rim portion of concave portion 410 to surround central axis CA. Plural annular grooves 432 are formed on second incidence surface 430. Second incidence surface 430 includes inner surfaces 434 of plural annular grooves 432. Second incidence surface 430 may further include another surface between outermost groove 432 and rear surface 450. That is, outermost groove 432 and rear surface 450 may not be in contact with each other.

As shown in FIGS. 6A and 6B, annular groove 432 forms intersection line 433 in cooperation with adjacent annular groove 432. That is, annular groove 432 does not have a surface between first groove 432 and adjacent second groove 432. Further, plural grooves 432 are disposed so that when virtual plane P1 that passes through an outer rim portion of second incidence surface 430 and is orthogonal to central axis CA is used as a reference plane, intersection line 433 become close to virtual plane P1 (reference plane) with distance from central axis CA. More specifically, plural grooves 432 are disposed so that respective intersection lines 433 are located on the same first virtual conical surface L1. Here, all intersection lines 433 are located outside in a radial direction of second virtual conical surface L2 defined by a tangential line at the opening rim portion of concave portion 410 as a generating line. First virtual conical surface L1 and second virtual conical surface L2 intersect with central axis CA at a position on the front side from any intersection line 433.

The shape of a cross section including optical axis LA, of each annular groove 432, is not particularly limited as long as the shape is an arc of which the center of curvature is located outside light flux controlling member 400 (on the side of light emitting element 300). For example, the shape of the cross section including optical axis LA, of annular groove 432, may include a circular arc that is a part of a true circle (see FIG. 6B), an arc that is a part of an ellipse, or the like. Further, the cross-sectional shape of each annular groove 432 may be the same in any place, or may be changed according to places. That is, each annular groove 432 may be rotationally symmetric (circularly symmetric) or may not be rotationally symmetric (circularly symmetric), with optical axis LA as an axis.

Further, second incidence surface 430 is formed in a range where light emitted from light emitting element 300 can enter light flux controlling member 400 at an angle greater than the angle of light that is incident on first incidence surface 420 with respect to optical axis LA. The formation range of second incidence surface 430 is set as follows.

First, before second incidence surface 430 is formed, in a light flux controlling member including a portion that extends inwardly in the radial direction from rear surface 450, the entire of first incidence surface 420 and rear surface 450 (also including the extended portion) is shielded. Light emitted from light emitting element 300 is caused to enter the light flux controlling member, and then, the illuminance on an illuminated surface (for example, a diffusion plate or the like in the surface light source device) that is disposed on the front side and is orthogonal to optical axis LA is checked. In a state where the entire of first incidence surface 420 and rear surface 450 is shielded, the illuminance on the illuminated surface is 0 (lx). Here, if a tonic opening (the center of which is optical axis LA) in which the shield is removed is formed at a central part of rear surface 450, the illuminance on the illuminated surface becomes high. Here, as the outer diameter of the opening is large, the illuminance on the illuminated surface is gradually increased. Further, if the outer diameter of the opening reaches a predetermined size, even though the outer diameter is larger than the predetermined size, the illuminance is not changed. If such a predetermined outer diameter is set as the outermost diameter in the formation range of second incidence surface 430, the shape of second incidence surface 430 sufficiently function to alleviate the illuminance of a belt-shaped bright part. In a case where the formation range of second incidence surface 430 is wider than the outermost diameter calculated in this manner, or even in a case where the formation range is narrower than the outermost diameter, second incidence surface 430 functions to alleviate the illuminance of the belt-shaped bright part although there is a difference in effect.

Emission surface 440 is formed on the front side of light flux controlling member 400 (on the side of light diffusion member 120) to protrude from flange 460. Emission surface 440 emits light that enters light flux controlling member 400 to the outside while controlling the light travelling direction. Emission surface 440 intersects with central axis CA, and is rotationally symmetric (circularly symmetric) with central axis CA as an axis.

Emission surface 440 includes first emission surface 441 that is located in a predetermined range around central axis CA, second emission surface 442 that is continuously formed around first emission surface 441, and third emission surface 443 that connects second emission surface 442 and flange 460 to each other (see FIG. 5B). First emission surface 441 is a smoothly curved surface that protrudes toward the rear side (toward the side of light emitting element 300). The shape of first emission surface 441 is a concave shape obtained by cutting a part of a spherical surface. Second emission surface 442 is a smoothly curved surface that is located around first emission surface 441 and protrudes toward the front side (toward the side of light diffusion member 120). The shape of second emission surface 442 is a tone convex shape. Third emission surface 443 is a curved surface that is located around second emission surface 442. In the cross section shown in FIG. 5B, the cross section of third emission surface 443 may be a linear shape, or may be a curved line shape.

Rear surface 450 is a surface that is located on the rear side and extends in a radial direction to the outside from the outer rim portion of second incidence surface 430. In the present embodiment, rear surface 450 is a plane that extends in a direction that is orthogonal to central axis CA from the outer rim portion of second incidence surface 430.

Flange 460 is located between an outer peripheral portion of emission surface 440 and an outer peripheral portion of rear surface 450, and protrudes outwardly in the radial direction around central axis CA. The shape of flange 460 is an approximately toric shape. Flange 460 is not an essential component, but as flange 460 is provided, it is easy to handle and position light flux controlling member 400. The thickness of flange 460 is not particularly limited, but is determined in consideration of a necessary area of emission surface 440, moldability of flange 460, or the like.

The plural legs 470 are approximately cylindrical members that protrude from rear surface 450. The plural legs 470 support light flux controlling member 400 at an appropriate position with respect to light emitting element 300.

Figure 7:
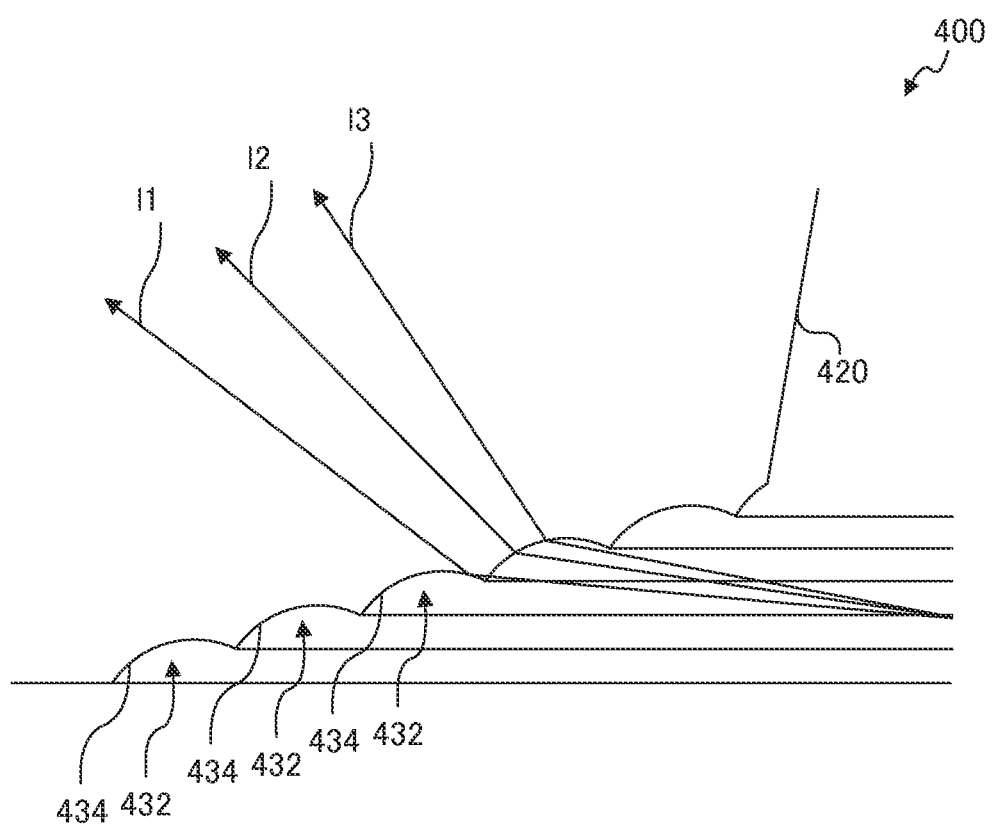
FIG. 7 is a partial optical path view illustrating the light flux controlling member according to Embodiment 1.

FIG. 7 is a view of an optical path in the vicinity of second incidence surface 430 of light flux controlling member 400 according to Embodiment 1. As described above, in light flux controlling member 400 according to Embodiment 1, most of light emitted from light emitting element 300 is incident on first incidence surface 420. Here, FIG. 7 shows an optical path of light that is not incident on first incidence surface 420. As shown in FIG. 7, in light flux controlling member 400, light beam I1 that is a part of light emitted from light emitting element 300 and is incident on an outer rim portion of inner surface 434 of groove 432 passes through the inside of light flux controlling member 400, and its travelling direction is controlled to be directed to emission surface 440 by inner surface 434 of groove 432 that is adjacent to the outside. Further, in the case of light beams I2 and I3 that are incident on a region other than the outer rim portion of inner surface 434, their travelling directions are controlled to be directed to emission surface 440 without being influenced by groove 432 on the outside. Since the shape of the cross section including central axis CA, of each annular groove 432, is an arc, the angle of inner surface 434 with respect to the angle of incident light is gradually changed. In this manner, in light flux controlling member 400 according to the present embodiment, since the inclining angles of inner surface 423 with respect to the angle of incident light are different from each other, light beams that are incident on inner surface 432 are controlled in their refraction angles so that their travelling directions are different from each other. That is, it is possible to prevent a ring-shaped bright part from being formed due to concentration of light emitted from light flux controlling member 400.

Light Distribution Characteristic of Light Flux Controlling Member

A simulation was performed for brightness distribution on a light diffusion member of a surface light source device using plural types of light flux controlling members. Illuminance on an illuminated surface disposed to be spaced from the outside surface of the light diffusion member by 0.5 mm was calculated using surface light source device 100 (hereinafter, referred to as "a surface light source device according to the present embodiment") to which one light emitting device 200 including light flux controlling member 400 according to Embodiment 1 is fixed. The illuminated surface is a virtual surface that is assumed to be irradiated with light that passes through the light diffusion member, and illuminance distribution obtained by the simulation is approximately equal to luminance distribution on the light diffusion member. Further, for comparison, the same simulation was also performed for a surface light source device (hereinafter, referred to as "a surface light source device according to a comparative example") including each of light flux controlling members shown in FIGS. 8A to 8C, instead of light flux controlling member 400 according to the present embodiment.

Figure 8A:
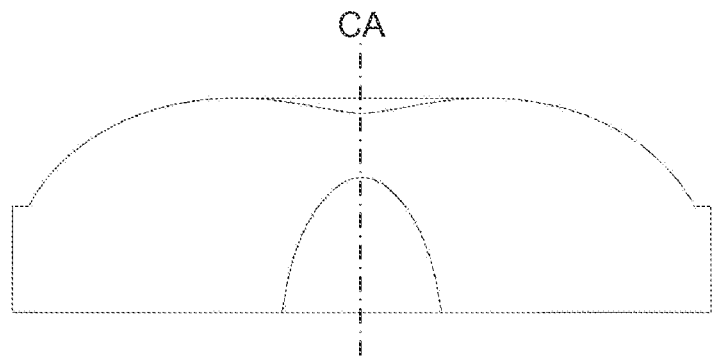
FIGS. 8A to 8C are cross-sectional views of light flux controlling members according to Comparative Examples 1 to 3.
Figure 8B:
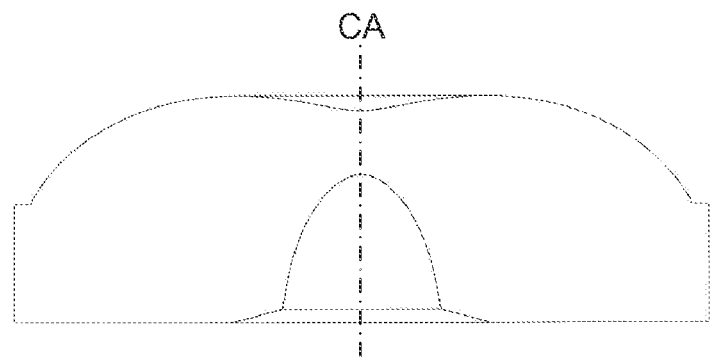
Figure 8C:
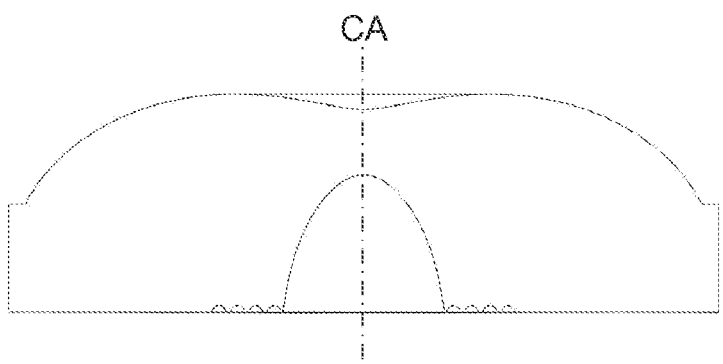
Figure 9A:
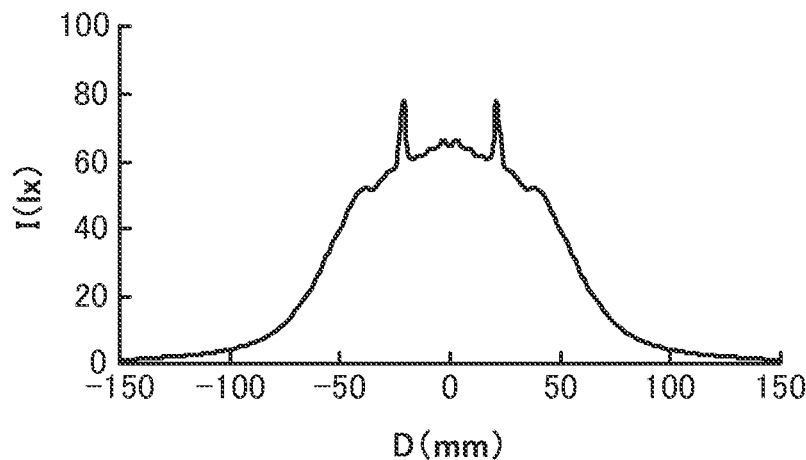
FIGS. 9A to 9C are graphs illustrating simulation results using light flux controlling members according to Comparative Examples 1 to 3.
Figure 9B:
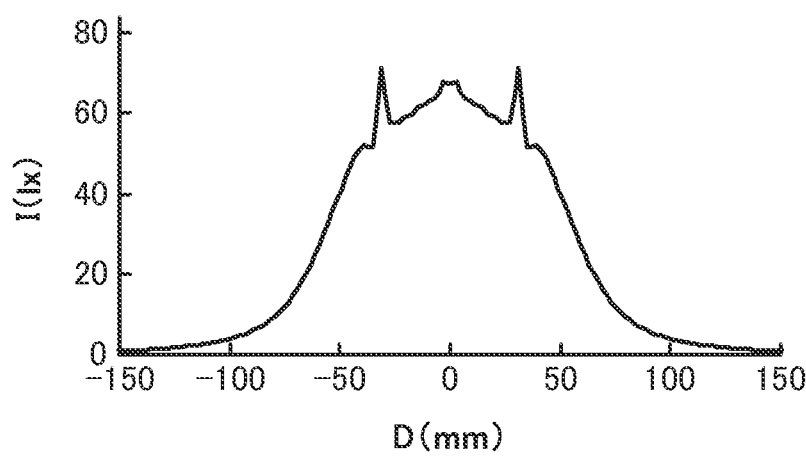
Figure 9C:
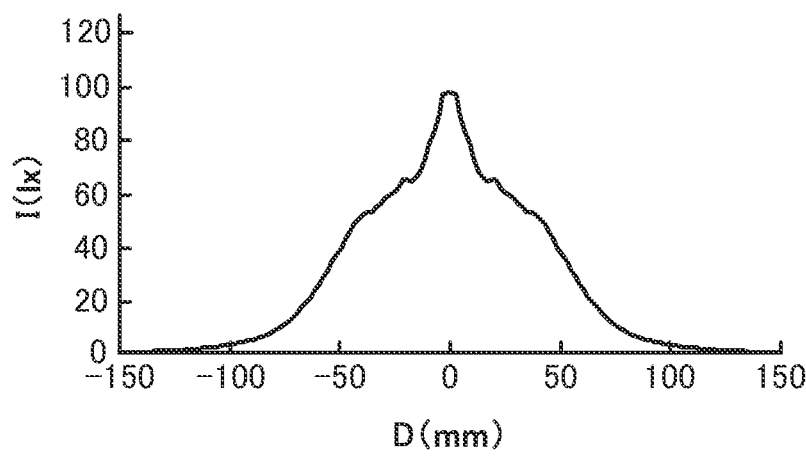

FIGS. 8A to 8C are cross-sectional views of light flux controlling members according to Comparative Examples 1 to 3. FIG. 8A is a view of an optical path of a light flux controlling member that does not include a second incidence surface, FIG. 8B is a view of an optical path of light flux controlling member in which a second incidence surface is an inclining surface, and FIG. 8C is a view of an optical path of a light flux controlling member that includes plural grooves on a rear surface of the light flux controlling member shown in FIG. 8A. FIGS. 9A to 9C show results obtained from the simulation in a case where the surface light source device includes one light emitting element. FIG. 9A shows a result obtained in a case where the light flux controlling member shown in FIG. 8A is used, FIG. 9B shows a result obtained in a case where the light flux controlling member shown in FIG. 8B is used, and FIG. 9C shows a result obtained in a case where the light flux controlling member shown in FIG. 8C is used. The transverse axis (D) in FIGS. 9A to 9C represents a distance from a central axis of a light flux controlling member, and the longitudinal axis (I) represents illuminance.

As shown in FIG. 8A, the light flux controlling member according to Comparative Example 1 does not include the second incidence surface. The light flux controlling member according to Comparative Example 1 is different from light flux controlling member 400 according to Embodiment 1 in that a rear surface is formed from an opening rim portion of a first incidence surface in a radial direction. In the light flux controlling member according to Comparative Example 1, if a light beam having a large angle with respect to optical axis LA enters the light flux controlling member through the rear surface, the light beam is refracted in a directly upward direction and is emitted through the emission surface. Thus, as shown in FIG. 9A, bright lines are formed on an illuminated surface in the light flux controlling member according to Comparative Example 1.

Further, as shown in FIG. 8B, in the light flux controlling member according to Comparative Example 2, the second incidence surface is the inclining surface. The second incidence surface of the light flux controlling member according to Comparative Example 2 has a constant inclining angle with respect to a rear surface. The light flux controlling member according to Comparative Example 2 is different from light flux controlling member 400 according to Embodiment 1 in that the second incidence surface is the inclining surface. In the light flux controlling member according to Comparative Example 2, a light beam having a large angle with respect to optical axis LA enters the light flux controlling member through the inclining surface having the constant angle with respect to the rear surface. In this case, in a similar way to the light flux controlling member according to Comparative Example 1, the incident light beam is refracted in a directly upward direction and is emitted through an emission surface. Thus, as shown in FIG. 9B, bright lines are similarly formed on an illuminated surface in the light flux controlling member according to Comparative Example 2.

Further, as shown in FIG. 8C, the light flux controlling member according to Comparative Example 3 includes the plural annular grooves on the rear surface of the light flux controlling member according to Comparative Example 1. The shape of a cross section including central axis CA, of each annular groove, is a circular arc of which the center of curvature is located outside the light flux controlling member. The light flux controlling member according to Comparative Example 3 is different from light flux controlling member 400 according to Embodiment 1 in that the annular grooves are formed on the rear surface and a surface is provided between a first groove and an adjacent second groove. In the light flux controlling member according to Comparative Example 3, a light beam that is incident on an inner surface of the groove is reflected on an inner surface of an adjacent groove through the inside of the light flux controlling member, is refracted in a directly upward direction, and is emitted through an emission surface. Otherwise, the light beam that is incident on the inner surface of the first groove is once emitted through an inner surface of an adjacent groove through the inside of the light flux controlling member, is again incident on an inner surface of a second groove, is refracted in a directly upward direction, and is emitted from the emission surface. Thus, as shown in FIG. 9C, although bright lines as in Comparative Example 1 and Comparative Example 2 are not formed on an illuminated surface, illuminance on the illuminated surface in a region directly above central axis CA is noticeably increased in the light flux controlling member according to Comparative Example 3.

Figure 10:
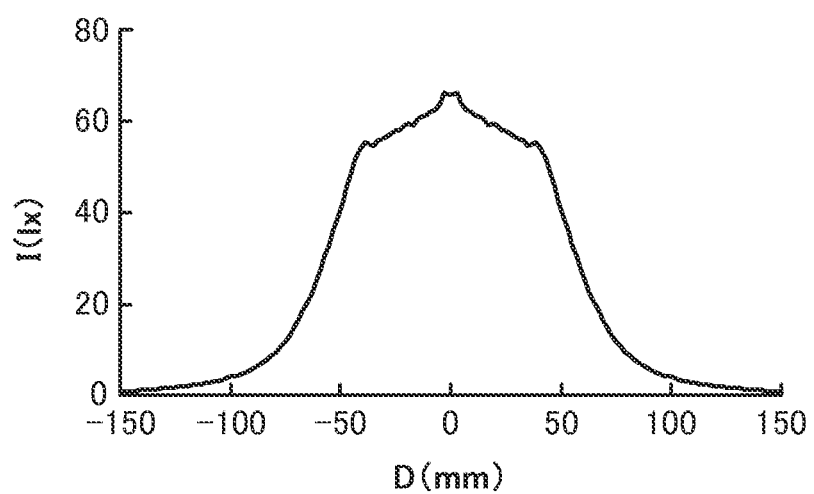
FIG. 10 is a graph illustrating a simulation result using the light flux controlling member according to Embodiment 1.

On the other hand, as shown in FIG. 10, in surface light source device 100 including light flux controlling member 400 according to the present embodiment, a rapid illuminance change does not occur compared with the surface light source devices according to Comparative Examples 1 to 3. It can be considered that this effect is obtained as the incidence angle with respect to second incidence surface 430 is gradually changed as described above.

Effects

As described above, in light flux controlling member 400 according to Embodiment 1, since the cross-sectional shape of groove 432 in the cross section including central axis CA is the arc shape, the deflection direction of light from light emitting element 300 is changed according to incidence positions. Thus, in surface light source device 100, a belt-shaped bright part (bright belt) does not occur. Further, since plural grooves 432 are arranged so that intersection line 433 is close to virtual plane P1 including the light emitting surface of light emitting element 300 as optical axis LA is distant, light that is incident on inner surface 434 of groove 432 is less interfered by groove 432 that is adjacent to the outside. Further, compared with the related art, since the large space is formed between substrate 140 (light emitting element 300) and light flux controlling member 400, it is possible to facilitate radiation of heat generated by light emitting element 300.

Embodiment 2

In Embodiment 2, light flux controlling member 500 that is capable of reflecting light that is incident on a first incidence surface and is reflected (Fresnel-reflected) toward a rear surface without being emitted through an emission surface, in a lateral direction on the side of the rear surface, in addition to the function of light flux controlling member 400 according to Embodiment 1 will be described.

A surface light source device according to Embodiment 2 of the invention is different from surface light source device 100 according to Embodiment 1 in that light flux controlling member 500 according to Embodiment 2 is provided instead of light flux controlling member 400 according to Embodiment 1. Thus, in the present embodiment, only light flux controlling member 500 according to Embodiment 2 will be described. Light flux controlling member 500 according to Embodiment 2 is different from light flux controlling member 400 according to Embodiment 1 in that reflection portion 580 is provided and rear surface 550 includes first rear surface 551 and second rear surface 552.

Here, the same components as in light flux controlling member 400 according to Embodiment 1 are given the same reference signs, and description thereof will be omitted.

Configuration of Light Flux Controlling Member

FIGS. 11A to 11C are diagrams illustrating a configuration of light flux controlling member 500 according to Embodiment 2. FIG. 11A is a bottom view of the light flux controlling member according to Embodiment 2, FIG. 11B is a cross-sectional view taken along line D-D in FIG. 11A, and FIG. 11C is a perspective view of the light flux controlling member. In FIG. 11C, legs 470 that are provided on rear surface 550 are not shown.

As shown in FIGS. 11A to 11C, light flux controlling member 500 includes reflection portion 580 in addition to concave portion 410, first incidence surface 420, second incidence surface 430, emission surface 440, rear surface 550, flange 460, and plural legs 470.

Reflection portion 580 is disposed on rear surface 550. Reflection portion 580 is disposed in a tonic shape to surround central axis CA. Plural protrusions 581 are formed in reflection portion 580. Each of plural protrusions 581 is formed so that a cross section that is perpendicular to ridge line 584 (to be described later) is an approximately triangular shape and is rotationally symmetric with respect to central axis CA (which is symmetric n times when the number of protrusions 581 is n). Each protrusion 581 includes planar first reflection surface 582, planar second reflection surface 583, and ridge line 584 that is an intersection line between first reflection surface 582 and second reflection surface 583, and functions like a total reflecting prism. As indicated by a broken line in FIG. 11C, virtual straight line L3 including ridge line 584 intersects with central axis CA at a position on the front side (on the side of light diffusion member 120) with reference to ridge line 584. That is, each protrusion 581 is inclined with respect to central axis CA at a predetermined angle (for example, 45°) so that the front side (the side of light diffusion member 120) is close to central axis CA compared with the rear side (the side of light emitting element 300).

Rear surface 550 includes first rear surface 551 and second rear surface 552. First rear surface 551 is a plane that extends between an outer rim portion of second incidence surface 430 and an inner opening rim portion of reflection portion 580. Further, second rear surface 552 is a plane that extends in a radial direction from an outer opening rim portion of reflection portion 580. First rear surface 551 and second rear surface 552 are disposed on the same plane.

The position of reflection portion 580 is not particularly limited, but it is preferable that plural protrusions 581 be formed in a region at which light Fresnel-reflected by emission surface 440 mainly arrives. Although the arrival position of light reflected by emission surface 440 is changed according to various factors such as the shape of emission surface 440, in light flux controlling member 500 according to Embodiment 2 shown in FIGS. 11A to 11C, most of light that is incident on first incidence surface 420 and is Fresnel-reflected by emission surface 440 arrives at a predetermined region of a toric shape even in rear surface 550. Although not shown in particular, as a result of a simulation of illuminance distribution in a region on substrate 140 that faces rear surface 550, using light flux controlling member 500 (in which the outer diameter of the rear surface is 15.5 mm), it is understood that the highest illuminance value is obtained in a region spaced from central axis CA by 5 mm to 6 mm. It is inferred that this region is a position at which light that is incident on first incidence surface 420 and is Fresnel-reflected by emission surface 440 easily arrives in a concentrative manner. Accordingly, in light flux controlling member 500, it is preferable that plural protrusions 581 be formed in a region spaced from central axis CA at least by 5 mm to 6 mm.

Modification Example

In light flux controlling member 600 according to a modification example of the present embodiment, the positions of second incidence surface 430 and first rear surface 551 are different from those in light flux controlling member 500 according to Embodiment 2. Here, the same components as in light flux controlling member 500 according to Embodiment 2 are given the same reference numerals, and description thereof will be omitted.

Configuration of Light Flux Controlling Member

Figure 12A:
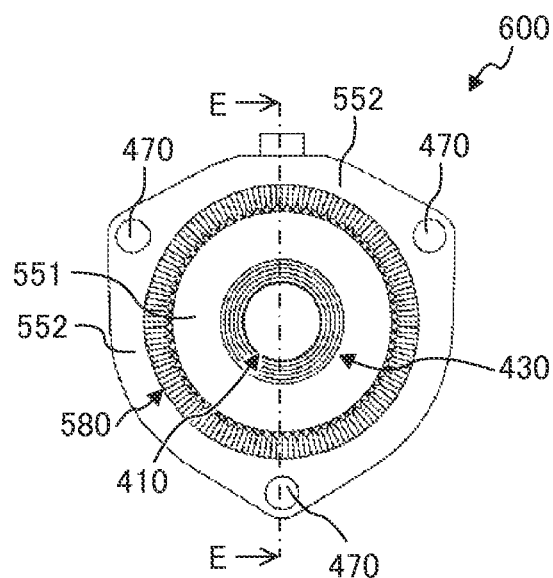
FIGS. 12A to 12D are diagrams illustrating modification examples of the light flux controlling member according to Embodiment 2.
Figure 12B:
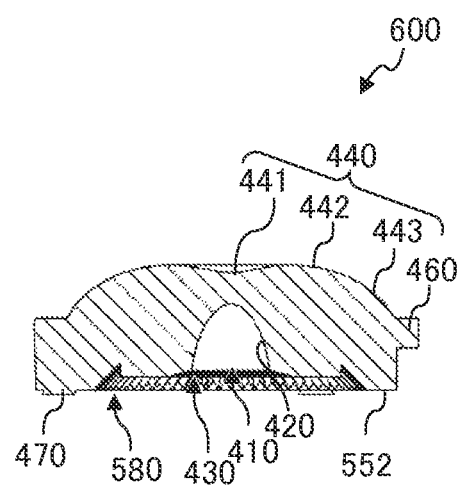
Figure 12C:
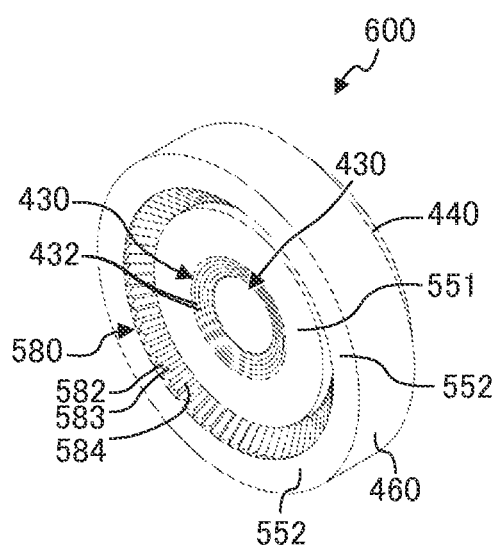
Figure 12D:
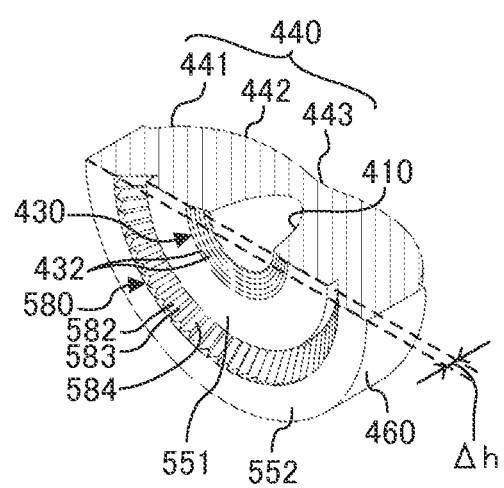

FIGS. 12A to 12D are diagrams illustrating a modification example of light flux controlling member 500 according to Embodiment 2. FIG. 12A is a bottom view of the modification example of light flux controlling member 500 according to Embodiment 2, FIG. 12B is a cross-sectional view taken along line E-E in FIG. 12A, FIG. 12C is a perspective view of the light flux controlling member in FIG. 12A, and FIG. 12D is a perspective cross-sectional view thereof.

As shown in FIGS. 12A to 12D, light flux controlling member 600 includes concave portion 410, first incidence surface 420, second incidence surface 430, emission surface 440, rear surface 550, reflection portion 580, flange 460, and plural legs 470.

Second incidence surface 430 of light flux controlling member 600 according to the modification example is disposed on an upper side (on the side of light diffusion member 120), compared with light flux controlling member 500 according to Embodiment 2. Thus, first rear surface 551 is disposed above second rear surface 552 by Δh. Second incidence surface 430 in this case is similarly formed so that light from light emitting element 300 that is emitted at a large angle with respect to optical axis LA can be incident thereon.

Effects

In light flux controlling members 500 and 600 according to Embodiment 2, in addition to the effects of light flux controlling member 400 according to Embodiment 1, since protrusions 581 (total reflecting prisms) are provided on an inclining surface, it is possible to reflect light that is Fresnel-reflected by emission surface 440 among light beams having a large emission angle in a lateral direction. Accordingly, in light flux controlling members 500 and 600 according to the present embodiment, since light reflected by emission surface 440 is light that travels in the lateral direction, it is possible to suppress light loss due to reflection from or absorption into substrate 140 of light reflected by emission surface 440.

INDUSTRIAL APPLICABILITY

The light flux controlling member, the light emitting device and the surface light source device according to the invention may be applied to a backlight of a liquid crystal display apparatus, a general lighting or the like, for example.

REFERENCE SIGNS LIST 10, 100 Surface light source device
20, 140 Substrate
30, 300 Light emitting element
40, 400, 500, 600 Light flux controlling member
42 Incidence surface
44, 440 Emission surface
46, 450, 550 Rear surface
50, 120 Light diffusion member
110 Casing
130 Bottom plate
200 Light emitting device
410 Concave portion
420 First incidence surface
430 Second incidence surface
432 Groove
433 Intersection line
434 Inner surface
441 First emission surface
442 Second emission surface
443 Third emission surface
460 Flange
470 Leg
551 First rear surface
552 Second rear surface
580 Reflection portion
581 Protrusion 582 First reflection surface
583 Second reflection surface
584 Ridge line
L1 First virtual conical surface
L2 Second virtual conical surface
L3 Virtual straight line
P1 Virtual plane

The invention claimed is:

1. A light flux controlling member that controls distribution of light emitted from a light emitting element, comprising:
 an emission surface formed on a front side of the light flux controlling member to intersect with a central axis of the light flux controlling member;
 a first incidence surface formed on a rear side of the light flux controlling member, the first incidence surface being an inner surface of a concave portion that is rotationally symmetric with respect to the central axis;
 a second incidence surface disposed outside an opening rim portion of the concave portion to surround the central axis; and
 a rear surface that extends radially outwardly from an outer rim portion of the second incidence surface,
 wherein a plurality of annular grooves is formed on the second incidence surface,
 wherein each of the plurality of annular grooves forms an annular intersection line in cooperation with another adjacent annular groove,
 wherein when a plane that passes through the outer rim portion of the second incidence surface and is orthogonal to the central axis is assumed as a reference plane, the plurality of annular grooves is disposed so that the intersection line become close to the reference plane with distance from the central axis, and
 wherein the shape of a cross section of the annular groove including the central axis is an arc of which the center of curvature is located outside the light flux controlling member.

2. The light flux controlling member according to claim 1, wherein the arc is a circular arc.

3. The light flux controlling member according to claim 1, wherein the plurality of annular grooves is rotationally symmetric with respect to the central axis.

4. The light flux controlling member according to claim 1, wherein the plurality of annular grooves is disposed so that the respective intersection lines are located on the same first virtual conical surface.

5. The light flux controlling member according to claim 1, wherein all the intersection lines are located outside in a radial direction of a second virtual conical surface defined by a tangential line at the opening rim portion of the concave portion as a generating line.

6. The light flux controlling member according to claim 1, wherein the rear surface extends from the outer rim portion of the second incidence surface in a direction that is orthogonal to the central axis.

7. The light flux controlling member according to claim 1, further comprising:
 a plurality of protrusions that has an approximately triangular cross section and is formed in the rear surface to surround the central axis,
 wherein each of the plurality of protrusions includes a first reflection surface, a second reflection surface and a ridge line that is an intersection line of the first reflection surface and the second reflection surface,
 wherein the plurality of protrusions is disposed to be rotationally symmetric with respect to the central axis, and
 wherein a virtual straight line including the ridge line intersects with the central axis at a front position with reference to the ridge line.

8. A light emitting device comprising:
 a light emitting element; and
 the light flux controlling member according to claim 1,
 wherein the light flux controlling member is disposed so that the central axis coincides with an optical axis of the light emitting element.

9. A surface light source device comprising:
 the light emitting device according to claim 8; and
 a light diffusion member that transmits light from the light emitting device while diffusing the light.

10. A display apparatus comprising:
 the surface light source device according to claim 9; and
 a display member configured to be irradiated with light emitted from the surface light source device.

* * * * *